United States Patent [19]

Wawrzyniak

[11] 4,039,230
[45] Aug. 2, 1977

[54] STRUCTURE FOR AND METHOD OF LUBRICATING A ROTATING FACING HEAD

[76] Inventor: Walter W. Wawrzyniak, 39230 Gary, Mount Clemens, Mich. 48043

[21] Appl. No.: 744,726

[22] Filed: Nov. 24, 1976

Related U.S. Application Data

[63] Continuation-in-part of Ser. No. 641,937, Dec. 18, 1975, Pat. No. 4,004,332.

[51] Int. Cl.² .................................................. F16C 33/66
[52] U.S. Cl. ....................................... 308/122; 308/187
[58] Field of Search ............... 308/106, 107, 110, 78, 308/122, 123, 187

[56] References Cited

U.S. PATENT DOCUMENTS

| | | | |
|---|---|---|---|
| 3,461,752 | 8/1969 | Kielas et al. | 308/122 X |
| 3,673,743 | 7/1972 | Giardini | 308/122 X |
| 3,717,393 | 2/1973 | Linda et al. | 308/122 |

*Primary Examiner*—Joseph F. Peters, Jr.
*Assistant Examiner*—Gene A. Church
*Attorney, Agent, or Firm*—Whittemore, Hulbert & Belknap

[57] ABSTRACT

Structure for and method of lubricating a rotating facing head or the like wherein the facing head is secured to a spindle rotatably mounted in a fixed frame for rotation with the facing head, including a lubricating ring concentric with the spindle and sleeved thereover secured to the frame, a lubricating passage extending radially through the lubricating ring, an annular groove between the lubricating ring and spindle in communication with the lubricating passage through the lubricating ring, radially extending passages through the spindle in communication at their outer end with the annular groove, sealing means for sealing between the inner surface of the lubricating ring and the outer surface of the spindle on each side of the ring, and an axially extending opening or passage within the spindle for passing lubricating fluid from the radially extending passages through the spindle axially of the spindle to the facing head.

The method of lubricating the facing head while it is rotating includes passing lubricating fluid through the lubricating passage in the ring around the annular groove and through the radially extending passages and axially extending openings or passages in the spindle to the facing head. The lubricating fluid may be placed under pressure. In one modification of the invention, a pumping action for the lubricating fluid toward the facing head is provided by rotation of the spindle.

10 Claims, 5 Drawing Figures

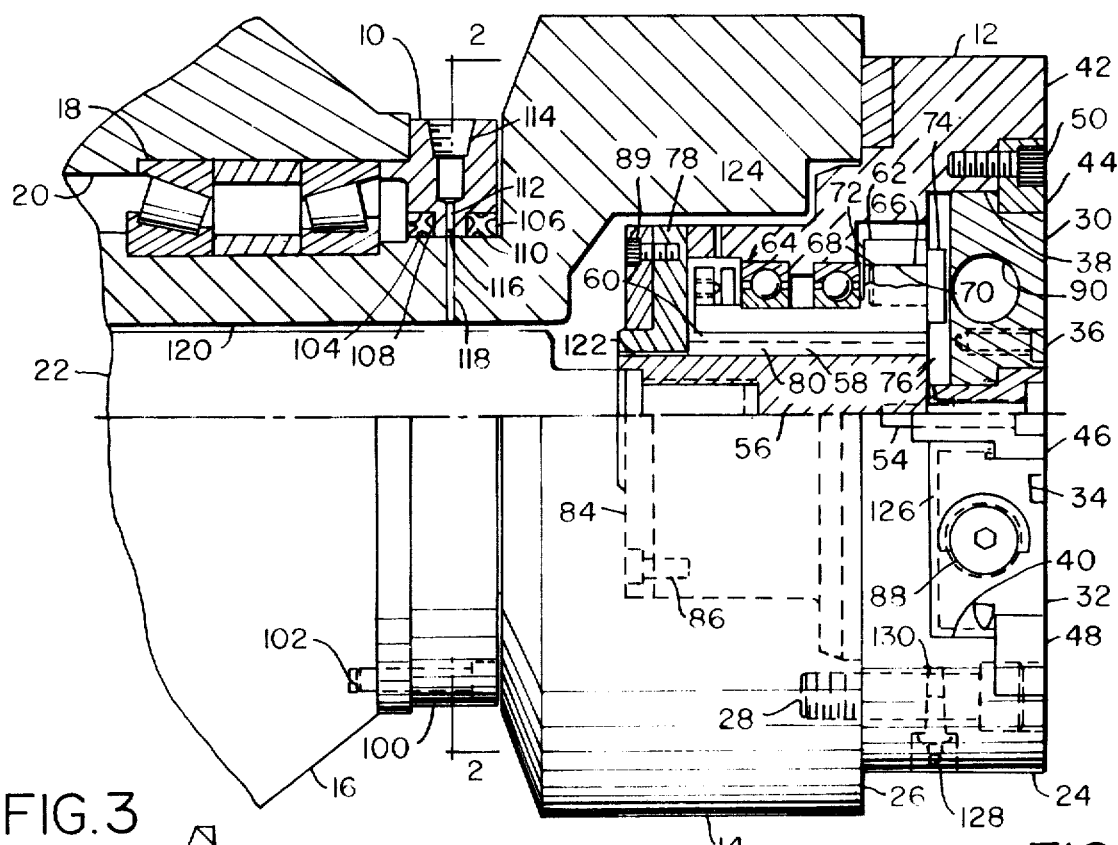

STRUCTURE FOR AND METHOD OF LUBRICATING A ROTATING FACING HEAD

CROSS REFERENCE TO RELATED APPLICATION

This application is a continuation-in-part of application Ser. No. 641,937, filed Dec. 18, 1975, now Pat. No. 4,004,332.

BACKGROUND OF THE INVENTION

1. Field of the Invention

The invention relates to facing heads or the like, and refers more specifically to a structure for and method of lubricating a facing head while rotating the facing head.

2. Description of the Prior Art

In the past, facing heads have generally been lubricated while in a stationary condition through a radially extending fitting in the facing head. Such lubricating structure and method requires the periodic bringing of a facing head to a stationary condition from the usual working, rotating condition of the facing head. Further, such lubricating structure and method does not provide uniform lubricating of the facing head during all periods of operation thereof, since as the lubricating fluid is used up or leaks from the facing head, uniform lubricating of the facing head is not accomplished.

Further, previous structure for lubricating facing heads and the like has sometimes been complicated and often inefficient. Thus, generally the lubricating fluid has not been under external pressure and no pumping action has been provided for the lubricating fluid to maintain the lubricating fluid under even slight pressure. Therefore, there has been no assurance that lubricating fluid in previous facing heads has penetrated the often complex moving parts of the facing head or remained in all portions of the rotating facing head, particularly during high-speed rotation of the facing head.

SUMMARY OF THE INVENTION

In accordance with the present invention, the structure for lubricating a facing head or the like while the facing head is rotated includes a lubricating ring concentric with and sleeved over a spindle rotatably mounted in a fixed frame. The lubricating ring is secured to the fixed frame while the facing head is secured to the spindle for rotation with the spindle relative to the fixed frame and lubricating ring. A lubricating passage is provided extending axially through the lubricating ring, which lubricating passage includes means for securing a lubricating line thereto at one end, and is in communication, at the other end, with an annular groove either in the inner surface of the lubricating ring or the outer surface of the spindle. A seal is provided between the inner surface of the lubricating ring and the outer surface of the spindle on each side of the annular groove. Radially extending passages are provided in the spindle in communication at one end with the annular groove and at the other end with an axially extending through the spindle. The axially extending opening or passage is or passage is in communication with the facing head to allow lubricating fluid in the axially extending opening to lubricate the working components of the facing head. The lubricating passage through the lubricating ring may be positioned radially or may be positioned so as to extend tangentially of the groove. The radially extending passages in the spindle may be inclined axially of the spindle as well as extending radially thereof toward the facing head radially inwardly of the spindle to direct the lubricating fluid toward the facing head. Also, the annular groove when in the spindle may have a radial depth which increases between the outer ends of the radially extending passages through the spindle in the direction opposite the direction of rotation of the spindle, and the radially extending passages in the spindle may be positioned so as to be tangential to the circumference of the axial opening through the spindle.

In accordance with the method of lubricating the facing head while it is rotating, the lubricating fluid is passed radially through the stationary ring secured to the fixed frame, around the circumference of the groove between the lubricating ring and spindle and radially and axially through the rotating spindle to the rotating facing head. In one modification of the method, the lubricating fluid is under pressure. In another modification of the method of lubricating the facing head while it is rotating, the lubricating fluid is pumped toward the facing head by rotation of the spindle.

BRIEF DESCRIPTION OF THE DRAWINGS

FIG. 1 is a partial, longitudinal elevation view with the top half shown in section of a facing head secured to a spindle, rotatably mounted in a frame, having structure for lubricating the facing head while it is rotated, constructed in accordance with the invention in conjunction therewith.

FIG. 2 is a cross section of the structure illustrated in FIG. 1, taken substantially on the line 2—2 in FIG. 1.

FIG. 3 is a longitudinal view similar to a portion of FIG. 1 and illustrating modified structure for lubricating the facing head while it is rotating.

FIG. 4 is a cross section of the structure illustrated in FIG. 3, taken substantially on the line 4—4 in FIG. 3.

FIG. 5 is a longitudinal view similar to a portion of FIG. 1 and illustrating further modified structure for lubricating the facing head while it is rotating.

DESCRIPTION OF THE PREFERRED EMBODIMENT

In FIG. 1, the structure 10 for lubricating a facing head while it is rotating is shown in conjunction with the facing head 12 secured to a spindle 14 for rotation therewith. The spindle 14 is secured in the fixed frame 16 for rotation relative thereto on the bearings 18.

The frame 16 can be the usual frame on any machine tool or machining module on a production line or the like, having an opening 20 therethrough for receiving the spindle 14, and an actuating bar 22 or the like for the facing head 12.

The spindle 14 as shown in FIG. 1 is mounted for rotation in the opening 20 on the bearings 18 in the usual manner. The spindle 14 is, however, modified in accordance with the invention to include axial and/or radially extending passages and in one modification includes an external annular groove therearound which are part of the structure 10 for lubricating the facing head 12 while it is rotating, which will be considered in more detail subsequently.

The facing head 12 is more fully disclosed in the related application referenced above. Briefly, the facing head 12 includes the body member 24 which, as shown, is secured to the end 26 of the spindle 14 by the bolts 28. A pair of slides 30 and 32, to which facing tools may be secured by means of channels 34 and screws 36, are positioned in guideways 38 and 40 provided in the end surface 42 of the body member 24 by the keepers 44, 46 and 48. The keepers are secured to the body member 24 by convenient means such as the screws 50 and 54.

The slides 30 and 32 are caused to move in opposite directions perpendicular to the plane of the drawing in FIG. 1 on axial movement of the actuating bar 22 through the gear means 56 having helical splines 58 on the outer surface thereof meshed with the helical splines 60 on the inner surface of the cam member 62. The cam member 62 is supported for rotation in the bearings 64 and produces movement of the slides 30 and 32 through cam keys 66 having a cylindrical end 68 in openings 70 in a flange 72 on the cam member 62 and a rectangular portion 74 in rectangular slots 76 in the bottoms of the slides 30 and 32.

The helical gear 56 is prevented from rotation on axial movement of the actuating bar 22 by the key 78 positioned within the longitudinally extending slot 80 on the gear means 56, which key is secured to the body member 12 through the cover by a bolt 82 through the cover 84 which is in turn secured to the body member by bolts 86. Slides 30 and 32 are provided with resilient bias means 88 positioned within openings 90 therein.

In operation, on axial movement of the actuating rod 22, the gear means 56 is caused to move axially to rotate the cam member 62, whereby the cam keys 66 rotate in the openings 70 and slide in the slots 76 to produce movement in opposite direction of the slides 30 and 32 to move facing tools secured thereto (not shown) radially with respect to the rotation of the spindle 14.

The facing head 12 and the operation thereof is explained in considerably more detail in the above indicated related application. Reference is made thereto for a more detailed explanation of the facing head 12 and other facing heads with which the structure 10 for lubricating a facing head while the facing head is rotating may be readily utilized.

The structure 10 for lubricating a facing head while it is rotating includes a lubricating ring 100 having a cross section as shown best in FIG. 1 and which is secured to the frame 16 by convenient means such as bolts 102. The lubricating ring 100 is concentric with and sleeved over the spindle 14, as shown in FIG. 1. Annular, flexible seals 104 and 106 are provided between the inner circumference of the lubricating ring 10 and the outer circumference of the spindle 14 on opposite sides of the lubricating ring 10, whereby the spindle 14 is allowed to rotate relative to the frame 16 and lubricating ring 10 with lubricating fluid being sealed between the ring and spindle. Seals 104 and 106 are positioned in annular notches 108 and 110 in the inner edges of the lubricating ring 10, as shown. A lubricating passage 112 extends radially of the lubricating ring 10 and communicates at its outer end with a threaded opening 114 for receiving a lubricating line fitting. The lubricating passage 112 connects at its other end, as shown in FIG. 1, to an annular groove 116 on the inner surface of the lubricating ring 10 between notches 108 and 110 in the embodiment of the invention shown in FIG. 1.

As shown best in FIG. 2, the annular groove 116 is in communication with radially extending passages 118 in the spindle 14. The opening 120, which extends axially of the spindle 14 and permits the actuating bar 22 to pass axially through the spindle 14 is of larger diameter than the outside diameter of the actuating bar 22, whereby the passage 118 is in communication with the interior of the facing head 12 through the axially extending passage 122 between the key 78 and slot 80 of the facing head 12 and the radially extending passage 124 therein.

Sealing means 126 such as O-ring material positoned within a rectangular slot is provided extending around the guiding flanges of the slides 30 and 32 at the ends thereof for sealing lubricant in the facing head 12 on movement of the slides 30 and 32.

Thus, in operation, with a lubricant line (not shown) connected to the lubricating ring 100 through the means for connecting a lubricating fitting thereto 114, the spindle is rotated in the usual manner and the facing head 12 is rotated therewith and may be actuated as desired by the actuating bar 22. Puring this rotation and/or actuation, fluid from the lubricating line passing into passage 112 will circulate around the groove 116 and will pass through radially extending passages 118 into the space between the actuating bar 22 and spindle and then into the interior of the facing head 12 through the openings 122 and/or 124 to produce full lubrication of the facing head at all times during rotation thereof.

Accordingly, it will not be necessary to stop the rotation of the facing head 12 for lubrication through the usual radially extending lubricating fitting 128 and passage 130 extending into the interior of the facing head 12. Further, the lubrication of the facing head will be more uniform, since as lubricating fluid is used or leaks from the facing head, it is replenished during rotation.

In the modified structure 132 shown in FIG. 3 for lubricating a facing head or the like while it is rotating, the groove 134 is in the outer surface of the spindle 136 rather than on the inner surface of the lubricating ring 138. Further, the groove 134 as shown increases in depth between the outer ends of annularly adjacent passages 140 extending radially therethrough, in the direction opposite the direction of rotation of the spindle 136, as shown in FIG. 4 by the arrow 142. Also, the radially extending passages 140 are inclined axially toward the facing head 12 radially inwardly of the spindle 136, as shown in FIG. 3, and are positioned to intersect the inner surface of the opening 120 through the spindle 136 tangentially, as shown best in FIG. 4. Further, the lubricating passage 144 extends through the lubricating ring 138 so as to be tangential to the groove 134, as shown best in FIG. 4.

The structure 132 for lubricating the facing head 12 while the facing head is rotating, is modified as indicated to improve the flow of fluid from a lubricating line toward the facing head. Due to the tangential positioning of the passages 140 and the particular configuration of the groove 134, as shown in best in FIG. 4, with respect to the direction of rotation of the spindle 136, as shown in FIG. 4 at 142, a pumping action is provided for the fluid passing to the facing head 12.

In the modified structure 150 for lubricating the facing head while the facing head is rotating, the passages 152 are of short radial extent and are in communication with axial passages 154 in the spindle 156 modified as shown in FIG. 5. The passages 154 are aligned with passages 158 in the facing head which direct the lubricating fluid in the facing head as desired. O-ring seals 160 set in annular recesses may be used to seal between the passages 154 and 158 as shown.

In the method of lubricating the facing head while the facing head is rotating, in accordance with the invention lubricating fluid is passed through the lubricating ring 100 and through the passage 112 therein. The lubricating fluid is then passed angularly around the groove 116 to fill the groove and is then passed radially through the angularly spaced apart passages 118 into the space between the actuating rod 22 and spindle 14. The lubricating fluid is then passed through either the opening 122 or opening 124 in the facing head 12 to lubricate the moving components of the facing head 12. The lubricating fluid passed into the lubricating ring 100 may be under pressure, as desired.

Further, as pointed out above, the lubricating fluid is actually pumped toward the facing head 12 in the modified structure of FIGS. 3 and 4 for lubricating the facing head 12 while it is rotated.

While one embodiment of the present invention and modifications thereof have been disclosed in detail, it will be understood that other embodiments and modifications of the invention are contemplated by the inventor. Thus, as indicated above, the structures 10 or 132 may be used in conjunction with different facing heads, as illustrated in the above referenced related patent application. Further, the individual modification features of FIGS. 3 and 4 can be utilized, for example, with the embodiment of the invention illustrated in FIGS. 1 and 2. Thus, for example, the groove 116 could be in the spindle 14 in the embodiment of FIG. 1, and/or the passages 118 may be slanted toward the facing head inwardly of the spindle in the FIG. 1 embodiment. It is intended to include all such modifications and embodiments as are defined by the appended claims within the scope of the invention.

What I claim as my invention is:

1. Structure for lubricating a rotation facing head while the facing head is rotating, comprising a stationary frame, a spindle rotatably mounted in the frame for carrying the facing head during rotation thereof, a lubricating member secured to the stationary frame and engaged with the rotatable spindle including means for passing lubricating fluid through the lubricating member, and means for passing lubricating fluid from the lubricating member radially through the spindle to the facing head while the spindle is rotating.

2. Structure as set forth in claim 1, wherein the lubricating member comprises a ring concentric with and sleeved over the spindle, means for attaching a lubricating fluid line to the ring, a radially extending passage in the ring for feeding lubricating fluid from the lubricating fluid line radially through the ring, and sealing means positioned between the ring and spindle for sealing lubricating fluid passing radially through the ring between the inner diameter of the ring and the outer diameter of the spindle.

3. Structure as set forth in claim 2, wherein the means for passing lubricating fluid from the lubricating member through the spindle includes an annular groove in one of the lubricating member and spindle in communication with the radially extending passage through the ring, and at least one radially extending passage extending between the exterior and interior of the spindle in communication on the exterior of the spindle with the annular groove.

4. Structure as set forth in claim 3, wherein the means for passing lubricating fluid from the lubricating member through the spindle further includes at least one axially extending passage in the spindle in communication with the one radially extending passage therein and a passage in the facing head in communication therewith.

5. Structure as set forth in claim 3, wherein the annular groove is on the interior surface of the ring.

6. Structure as set forth in claim 3, wherein the annular groove is on the exterior surface of the spindle.

7. Structure as set forth in claim 6, wherein there are a plurality of angularly spaced apart radially extending passages extending between between the exterior and interior of the spindle and the depth of the groove on the exterior surface of the spindle increases between the outer end of each of the radially extending passages in the spindle to the outer end of the next angularly adjacent radially extending passage in the spindle in an angular direction opposite the direction of rotation of the spindle.

8. Structure as set forth in claim 3, wherein the spindle includes an inner cylindrical surface and the passages through the spindle extend tangentially to the inner surface of the spindle.

9. Structure as set forth in claim 3, wherein the passages through the spindle are axially inclined toward the facing head radially inwardly of the spindle.

10. Structure as set forth in claim 3, wherein the passage through the ring extends tangentially to the inner surface of the ring.

* * * * *